United States Patent

[11] 3,591,924

| [72] | Inventor | Alan D. Berg |
| | | Washington, Mich. |
| [21] | Appl. No. | 805,746 |
| [22] | Filed | Mar. 10, 1969 |
| [45] | Patented | July 13, 1971 |
| [73] | Assignee | General Motors Corporation |
| | | Detroit, Mich. |

[54] DISPLACEMENT TRANSDUCER
3 Claims, 5 Drawing Figs.

[52] U.S. Cl. .................................................. 33/1 M,
33/DIG. 13, 73/517 R
[51] Int. Cl. .................................................. B43l 13/20
[50] Field of Search ...................................... 33/147
DIG. 13; 73/517 R

[56] References Cited
UNITED STATES PATENTS
2,761,216  9/1956  Gollub ........................ 33/147 DIG. 13
3,304,787  2/1967  Chiku et al. ................. 73/517

*Primary Examiner*—William D. Martin, Jr.
*Attorneys*—E. W. Christen, C. R. Meland and Tim G. Jagodzinski ABSTRACT: The distance of an object from the intersection of a plurality of mutually perpendicular reference axes is determined by measuring the bending strain on a plurality of cantilever beams each mounted perpendicular to a different one of the reference axes and each connected from its free end to the object by a different one of a plurality of tensioned springs.

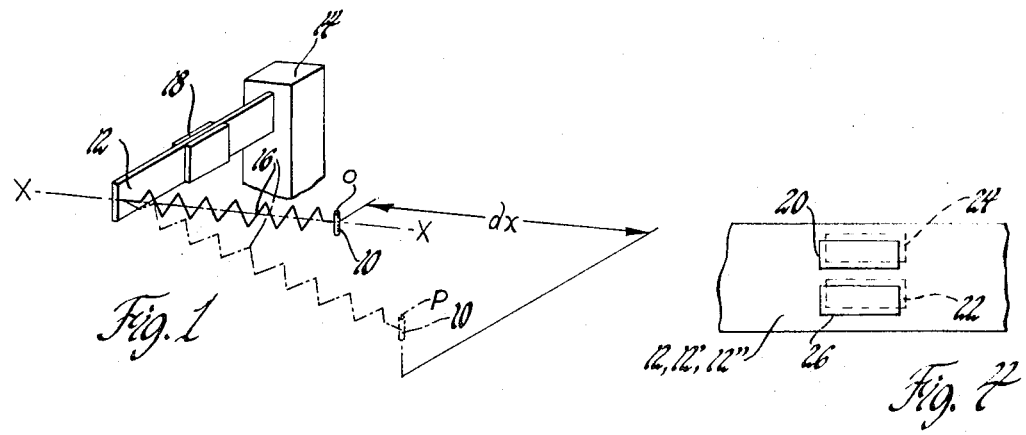
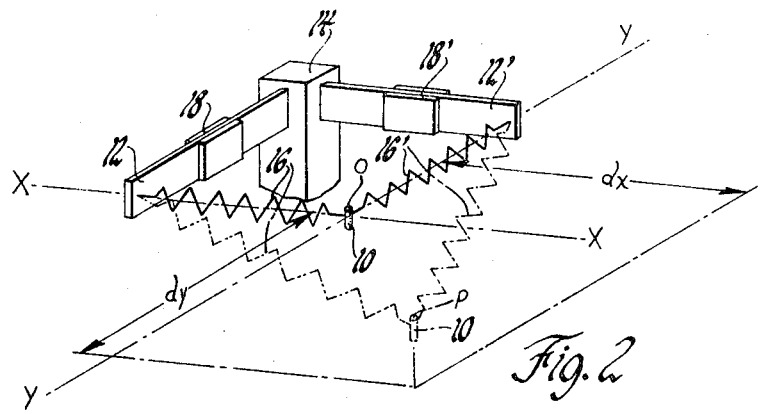
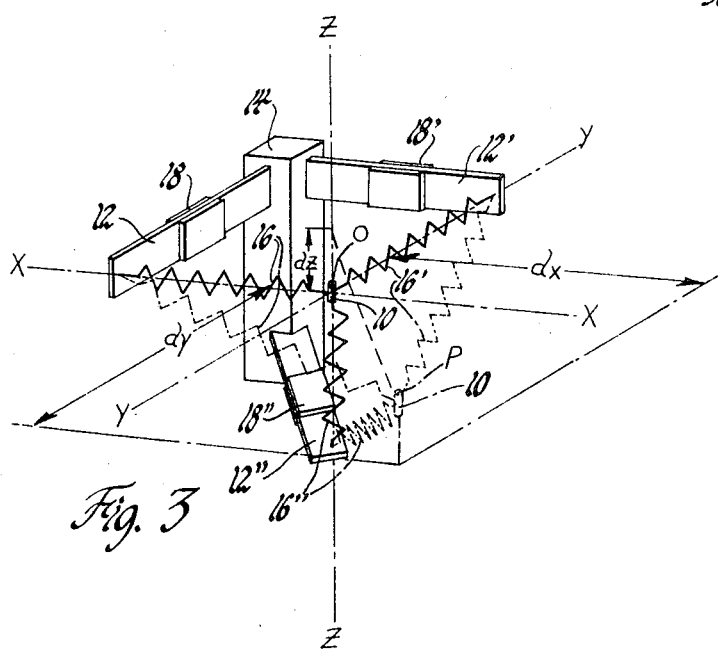
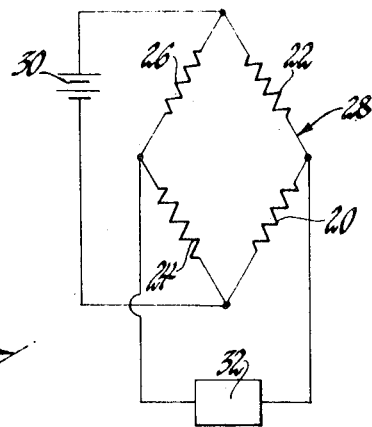
INVENTOR.
Alan D. Berg
BY
C.L. Meland
ATTORNEY

DISPLACEMENT TRANSDUCER

This invention relates to a position indicator and more particularly to a displacement transducer for determining the rectangular coordinates of a randomly positioned object.

According to one aspect of the invention, the distance of an object from a reference point is measured along a reference axis intersecting the reference point. In general, this is accomplished by determining the bending moment on a cantilever beam extending perpendicular to the reference axis and having its free end connected to the object by a tensioned spring.

In another aspect of the invention, the distance of an object from a reference point is measured along a plurality of mutually perpendicular reference axes intersecting at the reference point. Generally, this is accomplished by determining the individual bending moments on a plurality of cantilever beams each extending perpendicular to a different one of the reference axes and each connected from its free end to the object by a different one of a plurality of tensioned springs.

In yet another aspect of the invention, the bending moment of each of the cantilever beams is determined indirectly by monitoring the bending strain of the cantilever beams.

The invention may be best understood by reference to the following detailed description of several preferred embodiments when considered in conjunction with the accompanying drawing, in which:

FIG. 1 is a perspective view of a single axis displacement transducer incorporating the principles of the invention.

FIG. 2 is a perspective view of a double axis displacement transducer incorporating the principles of the invention.

FIG. 3 is a perspective view of a triple axis displacement transducer incorporating the principles of the invention.

FIG. 4 is a plan view of a strain gage arrangement which may be used in conjunction with the preferred embodiments of the invention.

FIG. 5 is a schematic diagram of a recording circuit which may be used in conjunction with the preferred embodiments of the invention.

FIG. 1 discloses a displacement transducer according to the invention for measuring the distance of an object 10 from a reference point O along a reference axis X-X intersecting the reference point O. The object 10 may be any body, such as a stylus or pen, capable of assuming a position to be measured. The illustrated single axis displacement transducer includes a cantilever leaf or beam 12 having a fixed end and a free end. A support 14 mounts the beam 12 by the fixed end so that it extends perpendicular to the reference axis X-X. A linear coil spring 16 is connected at one end to the free end of the beam 12 and at the other end to the object 10, which is initially located at the reference point O on the reference axis X-X.

It will be appreciated that as the object 10 is moved in free space away from the reference point O, the spring 16 is tensioned so as to produce a spring force on the free end of the beam 12. The spring force is a linear function of the distance of the object 10 from the reference point O measured along the axis of the spring 16. More importantly, however, the component of the spring force acting along the reference axis X-X is linearly proportional to the distance of the object 10 from the reference point O measured along the reference axis X-X. Therefore, as the object 10 is moved in free space away from the reference point O, the bending moment exerted on the beam 12 by the spring force produced by the tensioning of the spring 16 is linearly proportional to the distance of the object 10 from the reference point O measured along the reference axis X-X. It will be readily appreciated that this analysis agrees with the well-established principle of mechanics which holds that the bending moment on a cantilever beam is linearly proportional to the perpendicular component of the force on the free end of the beam.

Assuming the object 10 is moved to a position P located a distance $dx$ from the reference point O measured along the reference axis X-X, the ending moment exerted on the beam 12 by the spring force produced by the tensioned spring 16 is linearly proportional to the distance $dx$. Hence, the distance $dx$ can be ascertained by determining the bending moment on the cantilever beam 12. This is accomplished b monitoring the bending strain experienced by the beam 12. The bending strain of the beam 12 is linearly proportional to the bending stress of the beam 12, which in turn is linearly proportional to the bending moment on the beam 12. A strain gage sensor 18 is attached to the beam 12 to detect the bending strain. Thus, in the single axis displacement transducer of the invention, the strain gage sensor 18 detects the bending strain of the beam 12 which is linearly proportional to the distance $dx$ of the object 10 from the reference point O along the reference axis X-X.

FIG. 2 discloses a double axis displacement transducer according to the invention for measuring the distance of the object 10 from the reference point O along the reference axis X-X, and along a reference axis Y-Y which perpendicularly intersects the reference axis X-X at the reference point O. The illustrated double axis displacement transducer includes the structure of the single axis displacement transducer shown in FIG. 1. Further, the double axis displacement transducer includes an additional cantilever beam 12' having a fixed end and a free end. The support 14 mounts the beam 12' by the fixed end so that it extends perpendicular to the reference axis Y-Y. An additional linear coil spring 16' is connected at one end to the free end of the beam 12' and at the other end to the object 10.

As the object 10 is moved in free space away from the reference point O, the bending moment exerted on the beam 12' the spring force produced by the tensioning of the spring 16' is linearly proportional to the distance of the object 10 from the reference point O measured along the reference axis Y-Y. Assuming the object 10 is moved to the position P located a distance $dy$ from the reference point O measured along the reference axis Y-Y, the bending strain of the beam 12' is linearly proportional to the distance $dy$. An additional strain gage sensor 18' is attached to the beam 12' to detect the bending strain of the beam 12' which is linearly proportional to the bending moment on the beam 12'. Thus, in the double axis displacement transducer of the invention, the strain gage sensors 18 and 18' detect the individual bending strains of the beams 12 and 12' which are linearly proportional to the respective distances $dx$ and $dy$ of the object 10 from the reference point O measured along the corresponding reference axes X-X and Y-Y.

FIG. 3 discloses a triple axis displacement transducer according to the invention for measuring the distance of the object 10 from the reference point O along the reference axes X-X and Y-Y, and along a reference axis Z-Z which perpendicularly intersects the reference axes X-X and Y-Y at the reference point O. The illustrated triple axis displacement transducer includes the structure of the double axis displacement transducer shown in FIG. 2. Further, the triple axis displacement transducer includes an additional cantilever beam 12'' having a fixed end and a free end. The support 14 mounts the beam 12'' by the fixed end so that it extends perpendicular to the reference axis Z-Z. An additional linear coil spring 16'' is connected at one end to the free end of the beam 12'' and at the other end to the object 10.

As the object 10 is moved in free space away from the reference point O, the bending moment exerted on the beam 12'' by the spring force produced by the tensioning spring 16'' is linearly proportional to the distance of the object 10 from the reference point O measured along the reference axis Z-Z. Assuming the object 10 is moved to the position P located a distance $dz$ from the reference point O measured along the reference axis Z-Z, the bending strain of the beam 12'' is linearly proportional to the distance $dz$. An additional strain gage sensor 18'' is attached to the beam 12'' so as to detect the bending strain of the beam 12'' which is linearly proportional to the bending moment on the beam 12''. Thus, in thy triple axis displacement transducer of the invention, the strain gage sensors 18, 18' and 18'' detect the individual bending strains of the beams 12, 12' and 12'' which are proportional to the respective distances $dx$, $dy$ and $dz$ of the object 10 from the reference point O measured along the corresponding reference axes X-X, Y-Y and Z-Z.

FIG. 4 discloses one strain gage arrangement which may be used in conjunction with the strain gage sensors 18, 18' and 18''. However, it is to be understood that other strain gage arrangements could also be employed. The illustrated strain gage arrangements comprises four strain gage resistors 20, 22, 24 and 26, which may be of the wire type or the semiconductor type. The strain gages 20 and 26 are mounted adjacent to one another on one side of the beams 12, 12' and 12'', and the strain gages 22 and 24 are mounted adjacent to one another on the other side of the beams 12, 12' and 12'' opposite the strain gages 20 and 26.

FIG. 5 discloses one recording circuit which may be used in conjunction with the strain gage sensors 18, 18' and 18''. Again, it is to be understood that other recording circuits could also be employed. The illustrated recording circuit includes a conventional bridge 28 having the strain gage resistors 20, 22, 24 and 26 connected in adjacent arms of the bridge 24. A voltage source 30 is connected across the bridge 28 from the junction between the strain gages 20 and 24 to the junction between the strain gages 22 and 26. The voltage source 30 may be a direct current battery. A voltage indicator 32 is connected across the bridge 28 from the junction between the strain gages 20 and 22 to the junction between the strain gages 24 and 26. The indicator 32 may be a voltmeter, an oscillograph, or any other suitable voltage-indicating device. Although only one bridge 28 is illustrated, it is to be noted that the recording circuit includes a different bridge 28 for each of the strain gage sensors 18, 18' and 18''. It will be appreciated that the voltage source 30 and the indicator 32 are similarly connected across each of the bridges 28. In operation, the beams 12, 12' and 12'' are bent inwardly by the tensioning of the springs 16, 16' and 16'' as the object 10 is moved away from the reference point O. The inward bending of the beams 12, 12' and 12'' places the strain gages 20 and 26 in tension and the strain gages 22 and 24 in compression therey to increase the resistance of the strain gages 20 and 26 and decrease the resistance of the strain gages 22 and 24. The change in resistance between the strain gages 20 and 26 and the strain gages 22 and 24 develops a voltage difference across the indicator 28 which is linearly proportional to the distance of the object 10 from the reference point O measured along the corresponding reference axes X-X, Y-Y and Z-Z. The indicator 32 senses and records the voltage difference.

Preferably, the linear springs 16, 16' and 16'' are normally loaded in tension when the object 10 is at the reference point O. Thus, the strain gage sensors 18, 18' and 18'' detect a reference bending strain on the cantilever beams 12, 12' and 12'' when the object 10 is at the reference point O. Similarly, the strain gage sensors 18, 18' and 18'' detect a displaced bending strain on the cantilever beams 12, 12' and 12'' when the object 10 is displaced from the reference point O. Hence, as the object 10 is displaced in a direction inwardly from the reference point O as measured along any one of the reference axes X-X, Y-Y and Z-Z, with respect to the corresponding one of the cantilever beams 12, 12' and 12'', the tension of the associated one of the linear springs 16, 16' and 16'' decreases so that the displaced bending strain of the one of the beams 12, 12' and 12'' is proportionately decreased. Conversely, as the object 10 is displaced in a direction outwardly from the reference point as measured along any one of the reference axes X-X, Y-Y or Z-Z, with respect to the corresponding one of the cantilever beams 12, 12' and 12'', the tension of the associated one of the linear springs 16, 16' and 16'' increases so that the displaced bending strain of the one of the beams 12, 12' and 12'' is proportionately increased.

Therefore, the difference between the displaced bending strain and the reference bending strain of each of the cantilever beams 12, 12' and 12'' indicates the direction and the magnitude of the displacement of the object 10 from the reference point O as measured along each of the corresponding reference axes X-X, Y-Y and Z-Z. More specifically, the sign of the difference between the displaced bending strain and the reference bending strain of each of the cantilever beams 12, 12' and 12'' is determined by the direction of the displacement of the object 10 from the reference point O as measured along each of the corresponding reference axes X-X, Y-Y and Z-Z. Further, the magnitude of the difference between the displaced bending strain and the reference bending strain of each of the cantilever beams 12, 12' and 12'' is linearly proportional to the magnitude of the displacement of the object 10 from the reference point as measured along each of the corresponding reference axes X-X, Y-Y and Z-Z.

The difference between the displaced bending strain and the reference bending strain of the cantilever beam 12, 12' and 12'' can be conveniently measured by nulling the voltage indicator 32 to read approximately center scale when the object 10 is at the reference point O. Thus, as the object 10 is displaced inwardly from the reference point O, the reading of the voltage indicator 32 decreases from center scale. Contrarily, as the object 10 is displaced outwardly from the reference point O the reading of the voltage indicator 32 increases from center scale. Hence, the direction of the deviation in the reading of the voltage indicator 32 from center scale indicates the direction of the displacement of the object 10 from the reference point O as measured along the corresponding one of the reference axes X-X, Y-Y and Z-Z. Further, the magnitude of the deviation in the reading of the voltage indicator 32 is linearly proportional to the magnitude of the displacement of the object 10 from the reference point O as measured along the corresponding one of the reference axes X-X, Y-Y and Z-Z.

It will now be readily apparent that the cantilever beams 12, 12' and 12'' need not be flat leaves but may take any appropriate shape. Preferably, the beams 12, 12' and 12'' are made of steel, but they may be made of any suitable elastic material. Similarly, the bending strain of the cantilever beams 12, 12' and 12'' need not be monitored by the strain gage sensors 18, 18' and 18'', but may be detected by any compatible strain-sensing device. Likewise, the linear springs 16, 16' and 16'' need not be coil springs but may have any suitable configuration. Further, the springs 16, 16' and 16'' need net be linear providing the recording circuit is calibrated so as to compensate for any nonlinearity.

What I claim is:

1. A system for determining the random displacement of an object from a reference point in free space as projected along a reference axis intersecting the reference point, comprising: a cantilever beam having a fixed end and a free end; support means for mounting the cantilever beam by the fixed end so that the beam extends normal to the reference axis; a spring having one end connected to the object and the other end connected to the free end of the cantilever beam, the spring loaded in tension for producing a spring force which exerts a bending moment on the beam proportional to the component of the spring force acting along the reference axis; and sensing means for detecting the bending moment on the beam which is proportional to the displacement of the object from the reference point as projected along the reference axis.

2. A system for determining the direction and the magnitude of the random displacement of an object from a reference point in free space as projected along a reference axis intersecting the reference point, comprising: a cantilever beam having a fixed end and a free end; support means for mounting the cantilever beam by the fixed end so that the beam extends perpendicular to the reference axis; a linear spring having one end connected to the object and the other end connected to the free end of the cantilever beam, the spring loaded in tension for producing a spring force which exerts a bending moment on the beam causing the beam to experience a bending strain proportional to the component of the spring force acting along the reference axis, the location of the object at the reference point producing a reference bending strain on the beam and the displacement of the object and from the reference point in free space producing a displaced bending strain; and sensing means for detecting the bending strain of the cantilever beam, the sense of the difference between the displaced bending strain and the reference bending strain indicating the sense of the displacement of the object from the reference point as projected along the reference axis, and the magnitude of the difference between the displaced bending strain and the reference bending strain indicating the magnitude of the displacement of the object from the reference point as projected along the reference axis.

3. A system for determining the sense and the magnitude of the random displacement of an object from a reference point in free space as projected along a plurality of mutually perpendicular reference axes intersecting at the reference point, comprising: a plurality of cantilever beams each having a fixed end and a free end; support means for mounting the cantilever beams by the fixed end so that each of the beams extends normal to a different corresponding one of the reference axes; a plurality of linear springs each having one end connected to the object and the other end connected to the free end of a different associated one of the cantilever beams, each of the springs loaded in tension for producing a spring force which exerts a bending moment on the associated one of the beams causing the beam to experience a bending strain proportional to the component of the spring force acting along the corresponding one of the reference axes, the location of the object at the reference point producing a reference bending strain on each of the beams and the displacement of the object from the reference point in free space producing a displaced bending strain on each of the beams; and sensing means for detecting a bending strain on each of the cantilever beams, the sense of the difference between the displaced bending strain and the reference bending strain on each of the beams indicating the sense of the displacement of the object from the reference point as projected along the corresponding one of the reference axes, and the magnitude of the difference between the displaced bending strain and the reference bending strain on each of the beams indicating the magnitude of the displacement of the object from the reference point as projected along the corresponding one of the reference axes.